(12) United States Patent
Croft et al.

(10) Patent No.: US 6,233,336 B1
(45) Date of Patent: May 15, 2001

(54) INDUCTIVE COUPLING INTERFACE FOR ELECTRONIC DEVICE

(75) Inventors: Martin Croft; Ian Cash, both of Derby (GB)

(73) Assignee: Gai-Tronics Corporation, Mohnton, PA (US)

( * ) Notice: Subject to any disclaimer, the term of this patent is extended or adjusted under 35 U.S.C. 154(b) by 0 days.

(21) Appl. No.: 09/302,625

(22) Filed: Apr. 30, 1999

(51) Int. Cl.[7] .............................. H04M 1/00; H04M 1/24
(52) U.S. Cl. .............................................. 379/443; 379/52
(58) Field of Search ..................... 379/443, 52; 381/312, 381/326, 331

(56) References Cited

U.S. PATENT DOCUMENTS

| | | | |
|---|---|---|---|
| 3,601,550 | 8/1971 | Spracklen | 179/82 |
| 4,061,972 | 12/1977 | Burgess | 325/16 |
| 4,117,271 | 9/1978 | Teeter et al. | 179/82 |
| 4,361,733 | 11/1982 | Marutake et al. | 179/82 |
| 4,584,707 | 4/1986 | Goldberg et al. | 455/41 |
| 4,908,869 | 3/1990 | Lederman | 381/79 |
| 5,437,057 | 7/1995 | Richley et al. | 455/41 |
| 5,548,815 | 8/1996 | Takayama et al. | 455/41 |
| 5,557,673 * | 9/1996 | Grinzburg | 379/443 |
| 5,771,438 | 6/1998 | Palermo et al. | 455/41 |

* cited by examiner

Primary Examiner—Jack Chiang
(74) Attorney, Agent, or Firm—Woodcock Washburn Kurtz Mackiewicz & Norris LLP

(57) ABSTRACT

An inductive coupling interface couples a first electronic device to an inductive coupling link of a second electronic device. The second device link is in a coupling zone adjacent the interface. A separation plane separates the coupling zone from the interface. The interface includes a pair of coils arranged on one side of the separation plane opposite the coupling zone. The coils are coupled in series to receive an input signal from the first device and generate flux based thereon. Each coil is wound in a coil plane in a winding direction, and has a first flux face as defined by the winding direction and a coil plane axis residing within the coil plane. The first flux faces of the coils respectively face toward and away from the separation plane. The coil plane axes are parallel to one another and the separation plane, and the same distance from the separation plane. Each coil has inner and outer sides parallel to the coil plane axis and respectively closer to and farther from the other coil. Each coil plane resides at an angle with respect to the separation plane such that the inner side of each coil is closer to the separation plane than the outer side. The coils in operation generate an inductive field thereabouts that extends through the coupling zone from one coil to the other.

16 Claims, 1 Drawing Sheet

INDUCTIVE COUPLING INTERFACE FOR ELECTRONIC DEVICE

FIELD OF THE INVENTION

The present invention relates to an inductive coupling interface for an electronic device. More particularly, the present invention relates to such an interface for coupling a first electronic device to an inductive coupling link of a second electronic device by way of an inductive coupling field.

BACKGROUND OF THE INVENTION

It is oftentimes desirable to transmit data or information from one device to another without any physical connection therebetween. For example, in the case of a telephone set or the like, it may be desirable to transmit sound information received by the telephone from a remote source to a telephone user by way of some sort of ear piece without any wired connection between the ear piece and the telephone. In the case of a hard-of-hearing person wearing a hearing aid, it is advantageous to transmit the sound information from the telephone directly to such hearing aid. Likewise, it would be advantageous to transmit sound information from the telephone directly to a headset being worn by a person, to sound muffling gear being worn by an industrial or construction worker in a noisy environment, etc.

Especially in the case of a hard-of-hearing person wearing a hearing aid, it is known that such hearing aid may include an induction loop for receiving remotely generated induction signals. For example, such a hearing aid is disclosed in U.S. Pat. No. 4,361,733, hereby incorporated by reference. Such induction signals may be generated for receipt within a defined space such as a class room or auditorium. For example, a magnetic induction transmission system for transmitting to a hearing aid within a room is disclosed in U.S. Pat. No. 4,908,869, also hereby incorporated by reference.

Such induction signals may also be a by-product of an already-existing electronic device. For example, and as discussed in U.S. Pat. No. 4,908,869, it has been recognized that a typical telephone ear piece in a typical telephone handsets has a speaker that produces externally detectable audio-frequency magnetic (induction) fields correlated to the speech sound patterns created in such ear piece. Accordingly, a pick-up coil and related amplification circuitry have been included in hearing aids to detect such magnetic field signals and convert such magnetic field signals into sound signals to be directed toward the ear drum. In order to activate the pick-up coil and related circuitry, a hearing aid user simply flips a switch on the hearing aid unit.

Of course, such a system is not hands-free. The user having the hearing aid must actually pick up the telephone hand set and move the handset ear piece within range of the hearing aid so that the magnetic field generated by the ear piece can be detected by the pick-up coil in such hearing aid. Accordingly, a need exists for a hands-free inductive coupling interface for inductively coupling a telephone or the like to an inductive coupling link in a hearing aid or the like, wherein such inductive coupling does not require that a hearing aid user or the like pick up a handset or the like, and does not require that such hearing aid user or the like move the picked-up handset or other similar element within range of the hearing aid.

SUMMARY OF THE INVENTION

The present invention satisfies the aforementioned need by providing an inductive coupling interface for inductively coupling a first electronic device to an inductive coupling link of a second electronic device. The inductive coupling link of the second device is in a coupling zone adjacent to the interface. The coupling zone is separated from the interface by a separation plane.

The interface includes a pair of coils arranged on one side of the separation plane opposite the coupling zone. The coils are coupled in series to receive an input signal from the first device and generate flux based thereon. Each coil is wound generally in a coil plane in a winding direction, and has a first flux face as defined by the winding direction and a coil plane axis generally residing within the coil plane. The first flux face of one coil faces generally toward the separation plane, and the first flux face of the other coil faces generally away from the separation plane. The coil plane axes of the pair of coils are generally parallel to one another, generally parallel to the separation plane, and generally the same distance from the separation plane.

Each coil has an inner side generally parallel to the coil plane axis and relatively closer to the other coil, and an outer side generally parallel to the coil plane axis and relatively farther from the other coil. The coil plane of each coil resides at an angle with respect to the separation plane such that the inner side of each coil is closer to the separation plane than the outer side. The coils in operation generate an inductive field thereabouts, where the generated inductive field extends through the coupling zone from one coil to the other.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
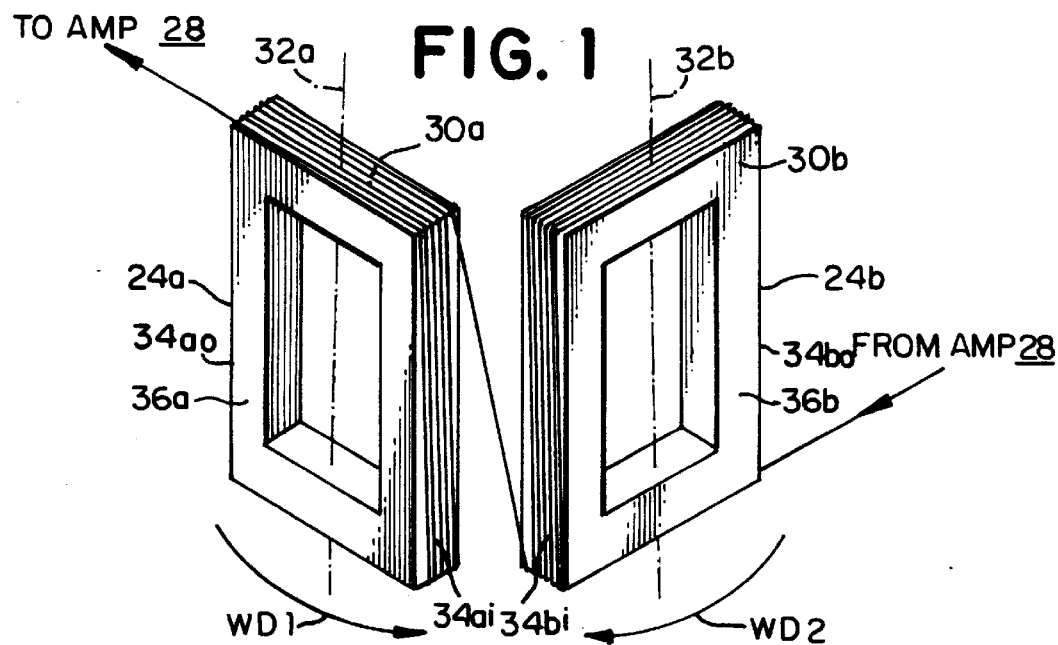
FIG. 1 is a perspective view of a pair of coils forming the interface in accordance with one embodiment of the present invention.

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The terminology includes the words above specifically mentioned, derivatives thereof, and words of similar import.

Figure 2:
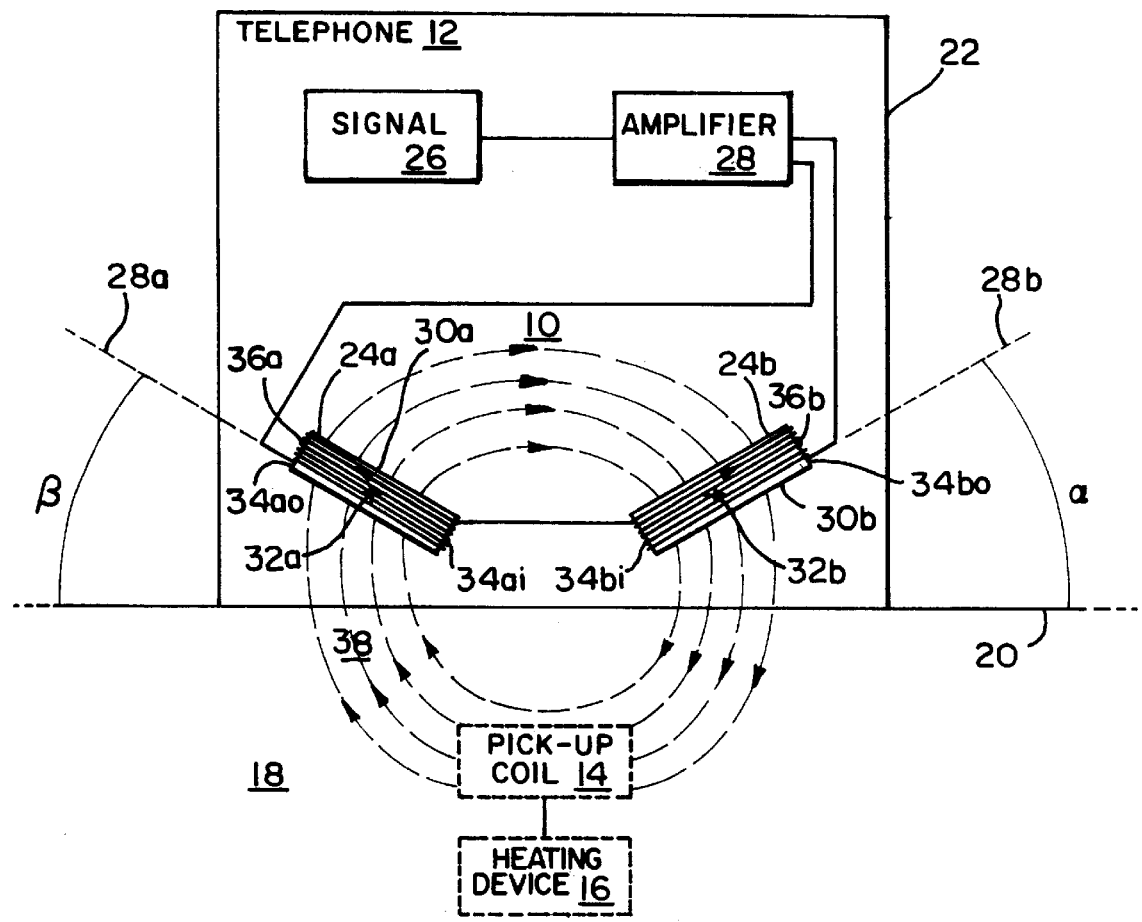
FIG. 2 is a top view showing the coils of FIG. 1 arranged in a telephone and with respect to a hearing device.

Referring to the drawings in detail, wherein like numerals are used to indicate like elements throughout, there is shown in FIGS. 1 and 2 an inductive coupling interface 10 for inductively coupling a first electronic device such as a telephone 12 to an inductive coupling link or pick-up coil 14 of a second electronic device such as a hearing device or hearing aid 16 in accordance with one embodiment of the present invention. Importantly, the interface 10 may be employed not just in connection with a telephone 12 and a hearing aid 16, but with any other first and second electronic devices 12, 16, wherein the first electronic device 12 is transmitting information to the second electronic device 16, without departing from the spirit and scope of the present invention. For example, the first electronic device 12 may be a computer keyboard and the second electronic device 16 may be part of a computer such that information typed into the keyboard is transmitted to the computer. Likewise, the first electronic device 12 may be any audio and/or video device receiving audio and/or video signals, and the second device 16 may be any device for receiving such audio and/or video signals from the first device 12.

Moreover, in the case where the first device 12 is a telephone, the second device 16 may be a hearing device other than a hearing aid without departing from the spirit and scope of the present invention. For example, in a noisy industrial environment, noise muffling headgear being worn by a worker may include a hearing device with an induction pick-up device. Likewise, in a calmer environment such as an office reception area, headgear worn by a receptionist may include such hearing device with such induction pick-up device.

As best seen in FIG. 2, and as should be understood based on the nature of induction, the inductive coupling link or pick-up coil 14 of the second electronic device or hearing device 16 is preferably positioned in a coupling zone 18 that is adjacent to the interface 10. As should be understood, the coupling zone 18 is a three dimensional space with a boundary that varies depending on the specific features of the interface 10, and also depending on the minimum inductive coupling requirements of the inductive coupling link or pick-up coil 14 of the second device or hearing device 16. Preferably, the size and extent of the coupling zone 18 is defined according to the particular application that is employing the interface 10. For example, if it is intended that the first and second devices 12, 16 are no more than a foot or two apart during coupling operation, the coupling zone 18 may extend only that far from the interface 10, or a bit further. Likewise, if the extent of separation is intended to be larger, then so too should the extent of the coupling zone 18 be larger.

As best seen in FIG. 2, the coupling zone 18 is separated from the interface 10 by a separation plane 20. As should be understood, the separation plane 20 acts as a reference with respect to placement of elements of the interface 10, as will be described below. Accordingly, the separation plane 20 need not actually be a physically separating plane, although such a physically separating plane 20 may be employed as the separation plane 20 without departing from the spirit and scope of the present invention. In fact, in one embodiment of the present invention, where the first device 12 is in fact a telephone, such telephone 12 resides in an enclosure 22 (FIG. 2), and the front face of such enclosure 22 is generally coextensive with such separation plane 20.

In one embodiment of the present invention, the interface 10 comprises a pair of coils 24a, 24b arranged on the side of the separation plane 20 opposite the coupling zone. Of course, other similar induction devices may be employed without departing from the spirit and scope of the present invention. As seen in FIG. 2, such coils 24a, 24b are located within the first device or telephone 12, although such coils 24a, 24b may be located external to the telephone 12 without departing from the spirit and scope of the present invention.

The coils are coupled in series, as best seen in FIG. 1, to receive an input signal 26 (FIG. 2) from the first device or telephone 12. Accordingly, such coils 24a, 24b generate magnetic flux based on such input signal 26. In the case of the telephone 12, the input signal 26 is the audio signal that is normally delivered to the ear piece of a telephone handset. However, the signal 26 may be any other signal without departing from the spirit and scope of the present invention. For example, the signal 26 may be a digital data signal, a video signal, etc. Furthermore, the signal 26 may be modulated or unmodulated. Of course, if modulated to a higher frequency range, such coils 24a, 24b should be designed to work with such frequency range.

As seen in FIG. 2, in one embodiment of the present invention, the interface 10 also includes an amplifier 28 that preliminarily receives the input signal 26 at an input thereof, and that provides an amplified signal corresponding to the input signal 26 at an output thereof. Accordingly, the pair of coils 24a, 24b are coupled in series across the output of the amplifier 28 to receive the amplified signal and generate magnetic flux based on such amplified signal. The amplifier 28 may be any appropriate amplifier without departing from the spirit and scope of the present invention, and furthermore may include appropriate filtering components (not shown) as necessary.

As seen in FIGS. 1 and 2, each coil 24a, 24b is wound generally in a coil plane 28a, 28b, respectively (FIG. 2), and in an opposite winding direction WD1, WD2, respectively (FIG. 1). As should be understood, each coil 24a, 24b is not wound exactly within the respective coil plane 28a, 28b but instead is wound in the vicinity of such coil plane 28a, 28b. The respective opposite winding direction WD1, WD2 of each coil 24a, 24b, as should be understood, defines a first flux face 30a, 30b for each coil 24a, 24b, respectively. As should also be understood, flux emanates from the first flux faces 30a, 30b of both coils 24a, 24b during operation thereof (as shown in FIG. 2), or else emanates from the faces opposite the first flux faces 30a, 30b of both coils 24a, 24b during operation thereof (not shown).

The selection of which face of each coil 24a, 24b is to be the first flux face 30a, 30b is arbitrary; such first flux faces 24a, 24b act as references. Specifically, in one embodiment of the present invention, the first flux face 30a, 30b of one coil 24a, 24b faces generally toward the separation plane 20, and the first flux face 30a, 30b of the other coil 24a, 24b faces generally away from the separation plane 20. Accordingly, and as seen in FIG. 2, flux generated by the coils 24a, 24b flows in a loop from the one coil 24a to the other coil 24b, and further from the other coil 24b back to the one coil 24a, although not necessarily in a circular loop.

Each coil 24a, 24b has a coil plane axis 32a, 32b, respectively, that generally resides within the coil plane 28a, 28b, respectively. As seen in FIGS. 1 and 2, the coil plane axes 32a, 32b are generally parallel to the respective first flux faces 30a, 30b, and are also generally parallel to one another. As seen in FIG. 2, the coil plane axes 32a, 32b are generally parallel to the separation plane 20, and are also generally the same distance from such separation plane 20.

Each coil 24a, 24b has an inner side 34ai, 34bi that is generally parallel to the coil plane axis 32a, 32b, and that is relatively closer to the other coil 24a, 24b. Likewise, each coil 24a, 24b also has an outer side 34ao, 34bo that is generally parallel to the coil plane axis 32a, 32b, and that is relatively farther from the other coil 24a, 24b. In one embodiment of the present invention, and as seen in FIG. 1, each coil 24a, 24b is formed on a rectangular frame 36a, 36b, such that the sides 34ai, 34bi, 34ao, 34bo are also rectangular. However, the frames 36a, 36b may have other shapes without departing from the spirit and scope of the present invention. For example, the frames 36a, 36b may be circular, semi-circular, oval, semi-oval, etc.

Importantly, in the present invention, the coil plane 28a, 28b of each coil 24a, 24b resides at an angle β, α, respectively with respect to the separation plane 20 such that the inner side 34ai, 34bi, of each coil 24a, 24b is closer to the separation plane 20 than the outer side 34ao, 34bo of such coil 24a, 24b. That is, each coil 24a, 24b is rotated on its coil axis 32a, 32b into such angled orientation. As such, the coils 24a, 24b in operation generate an inductive field 38, as seen in FIG. 2, that extends through the coupling zone 18 from one coil 24a, 24b to the other coil 24a, 24b.

As should be appreciated, the angled orientation of the coils 24a, 24b results in an inductive field 38 that extends relatively far out toward and through the coupling zone 18, and that does not extend relatively far out in the direction opposite the coupling zone 18. That is, the flux generated by the coils 24a, 24b forms a loop that has a relatively long portion in the area of the coupling zone 18, and that has a relatively short portion in the area opposite the coupling zone 18. Accordingly, the pick-up coil 14 of the second device 16 may be positioned a relatively far distance from the first device 12 and still be within the induction field 38 in the coupling zone 18. As may be appreciated, the short portion of the flux in the area opposite the coupling zone 18 provides an advantage in the telephone or first device 12 of the present invention in that such short portion produces less interference to the electronic components in the telephone or first device 12.

Of course, the pick-up coil 14 must be oriented such that a minimal amount of the flux passes therethrough. However, this should be relatively simple to design. For example, if the axes 32a, 32b and the separation plane 20 are all oriented to be generally vertical, then the pick-up coil 14 should be oriented in operation to be generally vertical also, generally midway between the coils 24a, 24b, and generally a distance far enough away from the separation plane 20 that the aforementioned minimal amount of flux passes therethrough.

In one embodiment of the present invention, the angle a is substantially equal to the angle β. Empirically, it has been determined that good results are obtained if α and β are 15–45 degrees. 30 degrees is believed optimal in some applications.

In addition to the benefit of establishing the relatively large coupling zone 18, as seen in FIG. 2, it has also been noted that if the enclosure 22 surrounding the first device 12 is not permeable to the induction field 38 (e.g., is metallic), such induction field 38 is minimally distorted by such non-permeable enclosure 22. Of course, the front face of the enclosure 22 should be permeable to the induction field 38 (e.g., is a plastic or an aluminum) so as to not distort such induction field 38, especially in the coupling zone 18.

In one embodiment of the present invention, where the first device is a telephone 12 and the second device is a hearing device 16, it has been found that good results are achieved when:

the signal presented to the coils 24a, 24b by the amplifier 28 has an average current of about 1 ampere;

each coil 24a, 24b has about 50 windings around its frame 36a, 36b;

each frame 36a, 36b is about 5.5 inches high by about 1.2 inches wide;

the coil axes 32a, 32b are set about 5.5 inches apart and about 0.5 inches from the separation plane 20 at the front face of the enclosure 22, thereby defining a coupling zone 18 that extends about 20 inches in front of the enclosure, about 36 inches wide, and about 36 inches high; and when the pick-up coil 14 and hearing device 16 are as specified in FCC 68.316—Hearing Aid Compatibility (FIG. 3) and can pick up a usable magnetic field of −11 to −31 dB relative to 1 Amp/meter. Of course, other values for the aforementioned parameters and other standards may be employed without departing from the spirit and scope of the present invention.

In the foregoing description, it can be seen that the present invention comprises a new and useful hands-free inductive coupling interface 10 for inductively coupling a telephone or the like 12 to an inductive coupling link 14 in a hearing aid or the like 16, wherein such inductive coupling does not require that a hearing device user or the like pick up a handset or the like, and does not require that such hearing device user or the like move the picked-up handset or other similar element within range of the hearing device. It should be appreciated by those skilled in the art that changes could be made to the embodiments described above without departing from the inventive concepts thereof.

For example, the base-band signal 26 transmitted from the first device 12 to the second device 16 by way of the interface 10 may be a base-band signal, or may be modulated by the first device 12 and demodulated by the second device via appropriate circuitry or the like (not shown). Generally, the interface 10 of the present invention may be employed in any situation where private communications between devices is desired, including situations where physical and/or electrical contact is undesirable, where a steerable induction field is desired, and/or where reduced interference with other devices is desired. It is understood, therefore, that this invention is not limited to the particular embodiments disclosed, but it is intended to cover modifications within the spirit and scope of the present invention as defined by the appended claims.

We claim:

1. An inductive coupling interface for inductively coupling a first electronic device to an inductive coupling link of a second electronic device, the inductive coupling link of the second device being in a coupling zone adjacent to the interface, the coupling zone separated from the interface by a separation plane, the interface comprising a pair of coils arranged on one side of the separation plane opposite the coupling zone, the coils being coupled in series to receive an input signal from the first device and generate flux based thereon, each coil being wound generally in a coil plane in a winding direction, each coil having a first flux face as defined by the winding direction and a coil plane axis generally residing within the coil plane, the first flux face of one coil facing generally toward the separation plane, the first flux face of the other coil facing generally away from the separation plane, the coil plane axes of the pair of coils being generally parallel to one another, generally parallel to the separation plane, and generally the same distance from the separation plane, each coil having an inner side generally parallel to the coil plane axis and relatively closer to the other coil, and an outer side generally parallel to the coil plane axis and relatively farther from the other coil, the coil plane of each coil residing at an angle with respect to the separation plane such that the inner side of each coil is closer to the separation plane than the outer side, wherein the coils in operation generate an inductive field extends through the coupling zone from one coil to the other.

2. The interface of claim 1 wherein the first device is a telephone.

3. The interface of claim 1 wherein the second device is a hearing device, and wherein the inductive coupling link thereof comprises a coil.

4. The interface of claim 1 residing in an enclosure having a front face generally coextensive with the separation plane.

5. The interface of claim 1 further comprising an amplifier having an input for receiving the input signal from the first device and an output for providing an amplified signal corresponding to the input signal, the pair of coils being coupled in series across the output of the amplifier to receive the amplified signal and generate flux based thereon.

6. The interface of claim 1 wherein the coil plane of each coil resides at about the same angle with respect to the separation plane.

7. The interface of claim 1 wherein the coil plane of each coil resides at about a 15–45 degree angle with respect to the separation plane.

8. The interface of claim 7 wherein the coil plane of each coil resides at about a 30 degree angle with respect to the separation plane.

9. A first electronic device comprising an inductive coupling interface for inductively coupling the first device to an inductive coupling link of a second electronic device, the inductive coupling link of the second device being in a coupling zone adjacent to the interface, the coupling zone separated from the interface by a separation plane, the interface including a pair of coils arranged on one side of the separation plane opposite the coupling zone, the coils being coupled in series to receive an input signal from the first device and generate flux based thereon, each coil being wound generally in a coil plane in a winding direction, each coil having a first flux face as defined by the winding direction and a coil plane axis generally residing within the coil plane, the first flux face of one coil facing generally toward the separation plane, the first flux face of the other coil facing generally away from the separation plane, the coil plane axes of the pair of coils being generally parallel to one another, generally parallel to the separation plane, and generally the same distance from the separation plane, each coil having an inner side generally parallel to the coil plane axis and relatively closer to the other coil, and an outer side generally parallel to the coil plane axis and relatively farther from the other coil, the coil plane of each coil residing at an angle with respect to the separation plane such that the inner side of each coil is closer to the separation plane than the outer side, wherein the coils in operation generate an inductive field thereabouts, the generated inductive field extends through the coupling zone from one coil to the other.

10. The first device of claim 9 comprising a telephone.

11. The first device of claim 9 wherein the second device is a hearing aid, and wherein the inductive coupling link thereof comprises a coil.

12. The first device of claim 9 residing in an enclosure having a front face generally coextensive with the separation plane.

13. The first device of claim 9 further comprising an amplifier having an input for receiving the input signal from the first device and an output for providing an amplified signal corresponding to the input signal, the pair of coils being coupled in series across the output of the amplifier to receive the amplified signal and generate flux based thereon.

14. The first device of claim 9 wherein the coil plane of each coil resides at about the same angle with respect to the separation plane.

15. The first device of claim 9 wherein the coil plane of each coil resides at about a 15–45 degree angle with respect to the separation plane.

16. The first device of claim 15 wherein the coil plane of each coil resides at about a 30 degree angle with respect to the separation plane.

* * * * *